United States Patent
Ovsiannikov

(10) Patent No.: US 8,391,629 B2
(45) Date of Patent: Mar. 5, 2013

(54) METHOD AND APPARATUS FOR IMAGE NOISE REDUCTION USING NOISE MODELS

(75) Inventor: Ilia Ovsiannikov, Studio City, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 13/330,077

(22) Filed: Dec. 19, 2011

(65) Prior Publication Data
US 2012/0092526 A1   Apr. 19, 2012

Related U.S. Application Data

(63) Continuation of application No. 11/512,299, filed on Aug. 30, 2006, now Pat. No. 8,160,381.

(51) Int. Cl.
*G06K 9/00*  (2006.01)
(52) U.S. Cl. .................................. 382/261; 382/166
(58) Field of Classification Search ............ 382/261
See application file for complete search history.

(56) References Cited

U.S. PATENT DOCUMENTS

| | | | |
|---|---|---|---|
| 4,761,819 A | 8/1988 | Denison et al. |
| 5,229,864 A | 7/1993 | Moronaga et al. |
| 5,828,467 A | 10/1998 | Suzuki |
| 5,848,181 A | 12/1998 | Ogata |
| 6,038,374 A | 3/2000 | Jacob et al. |
| 6,108,455 A | 8/2000 | Mancuso |
| 6,178,205 B1 | 1/2001 | Cheung et al. |
| 2002/0126892 A1 | 9/2002 | Gindele et al. |

OTHER PUBLICATIONS

International Search Report (5 pages).
Written Opinion (7 pages).

*Primary Examiner* — Hadi Akhavannik
(74) *Attorney, Agent, or Firm* — Dickstein Shapiro LLP

(57) ABSTRACT

A method and apparatus for processing imager pixel signals to reduce noise. The processing includes receiving a target pixel signal, receiving at least one neighboring pixel signal, formulating a dynamic noise signal based at least in part on a value of the target pixel signal, and controlling a noise reduction operation using the dynamic noise signal.

27 Claims, 10 Drawing Sheets

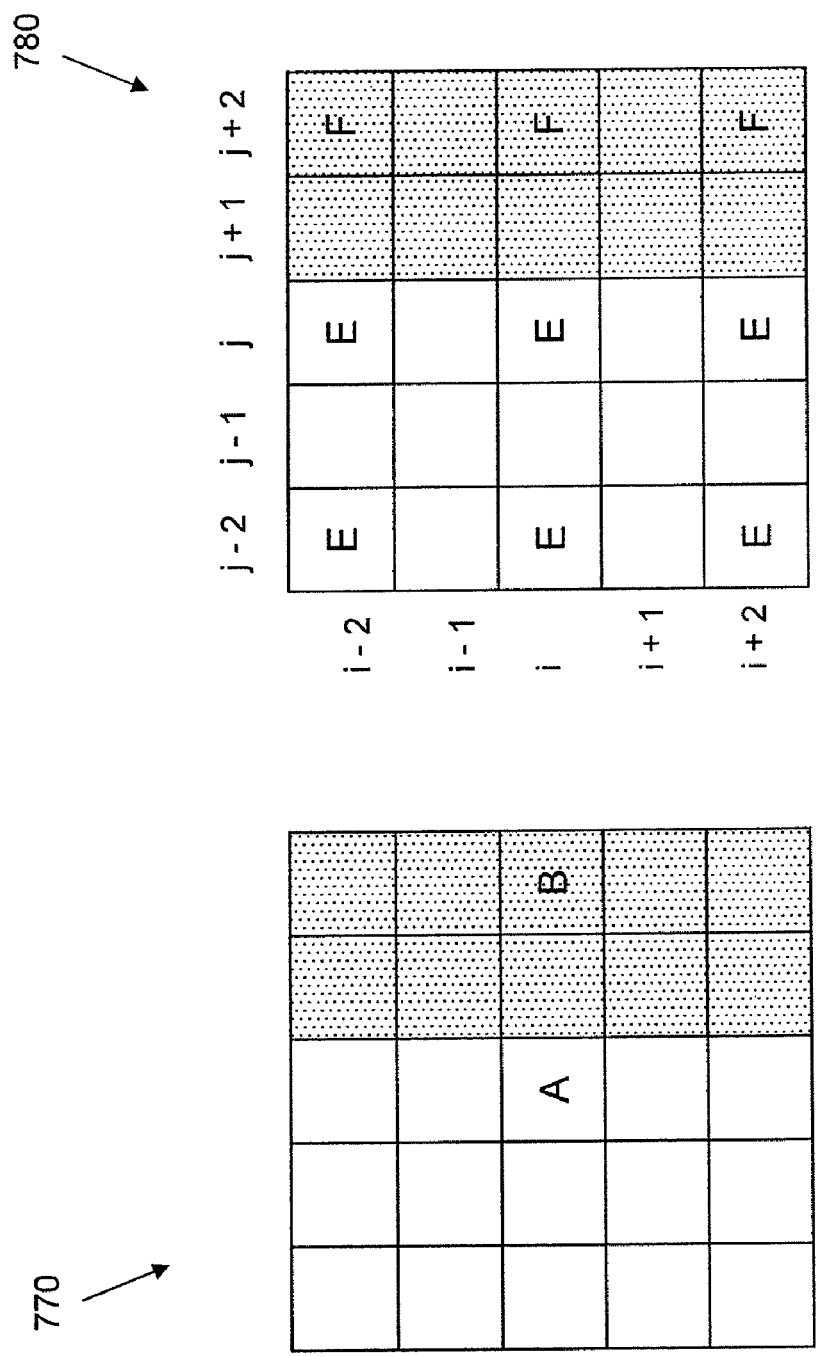

METHOD AND APPARATUS FOR IMAGE NOISE REDUCTION USING NOISE MODELS

CROSS-REFERENCE TO RELATED APPLICATIONS

This application is a continuation of Application No. 11/512,299, filed Aug. 30, 2006 now U.S. Pat. No. 8,160,381, the entirety of which is incorporated herein by reference.

FIELD OF THE INVENTION

Disclosed embodiments relate to image processing to reduce image noise.

BACKGROUND OF THE INVENTION

Digital image capture has received widespread acceptance by users of image capture equipment. Both still and video digital cameras, which use solid-state imagers or image sensors to capture images, are presently in widespread use. Common solid-state imagers, which have an array of pixels for image capture are based on CCD and CMOS technology, as well as others.

One problem confronted by solid-state imagers is the presence of noise in the captured image, particularly under low-light conditions, and/or where an ISO setting of a camera is set high, resulting in shorter image integration times. Image noise appears in a displayed or a printed image as a graininess in the image.

Past image capture processing approaches have been used in an attempt to reduce image noise. Such approaches typically rely on a softening, or blurring, of the overall image. However, such techniques may soften the entire image, even in areas of the image where noise is not present or is at least visually imperceptible. Moreover, softening of the overall image—analogous to a small defocusing of an imaging lens—reduces image sharpness, which is typically undesirable.

Color imagers typically output red/green/blue (RGB) color signals from a pixel array, since each imager pixel is typically covered by one of a red, green, or blue filter; arranged, for example, as in a Bayer pattern, illustrated in FIG. 1. To obtain red, green, and blue information for each pixel of an image, color interpolation is needed. This process, known as "demosaicing," analyzes the color values of appropriate neighboring pixels to estimate, in effect, each pixel's unknown color data. If one of the green pixels on a RGRG sequence line of the Bayer pattern (e.g., the third line of the array 82 of FIG. 1) is being read out, the process of color interpolation estimates the pixel's blue value by looking at the values of the blue pixels above and below it, and combining those blue values. For the red color estimate, the process looks at the values of the red pixels to the left and right of the green pixel and combines those values.

The captured image is subject to blur due to various causes, including a limited resolution of the camera lens, inter-pixel cross-talk in the sensor array and various image processing that adds intentional or unintentional blur. Aperture correction sharpens or "deblurs" the image. The sharpening is performed by increasing the gain of high frequency components of the image. While this makes the overall image sharper, it also accentuates any noise in the image, since random pixel-to-pixel variations are amplified, as well.

The RGB values, determined during demosaicing, may be converted to YUV values, where Y is a luminance value and UV are chrominance values for additional pixel processing.

Conventional aperture correction involves comparing the difference in a luminance value of the target pixel and its surrounding pixels to a preset threshold value, set during manufacturing. If the threshold value is exceeded, the target pixel is subjected to aperture correction, e.g., increase of that difference, at a preset level. Such conventional systems select the threshold value to minimize visible noise in areas of all levels of brightness. This may result in excessive blur of dark areas, while achieving only moderate noise suppression in bright areas.

Accordingly, there is a need and desire to more selectively reduce noise in a captured image in accordance with detected image noise parameters.

BRIEF DESCRIPTION OF THE DRAWINGS

FIG. 7B is a diagram of a color filter array including an edge.

FIG. 7C is a diagram of another color filter array including an edge.

DETAILED DESCRIPTION OF THE INVENTION

In the following detailed description, reference is made to the accompanying drawings, which form a part hereof and show by way of illustration specific embodiments in which the invention may be practiced. These embodiments are described in sufficient detail to enable those skilled in the art to practice them, and it is to be understood that other embodiments may be utilized, and that structural, logical, processing, and electrical changes may be made. The progression of processing steps described is an example; however, the sequence of steps is not limited to that set forth herein and may be changed as is known in the art, with the exception of steps necessarily occurring in a certain order.

The term "pixel," as used herein, refers to a photo-element unit cell containing a photosensor and associated transistors for converting photons to an electrical signal.

The embodiments described herein are presented in the context of a CMOS imager, which is employed in a digital still or video camera to reduce noise in a captured image. However, this is but one example of an imager that may be used. Embodiments may be implemented using other image capture technologies such as, e.g., CCD. Indeed, embodiments can be implemented to reduce noise on any image captured by any image capturing technology, using the post-image capture digital processing techniques described herein.

Figure 1:
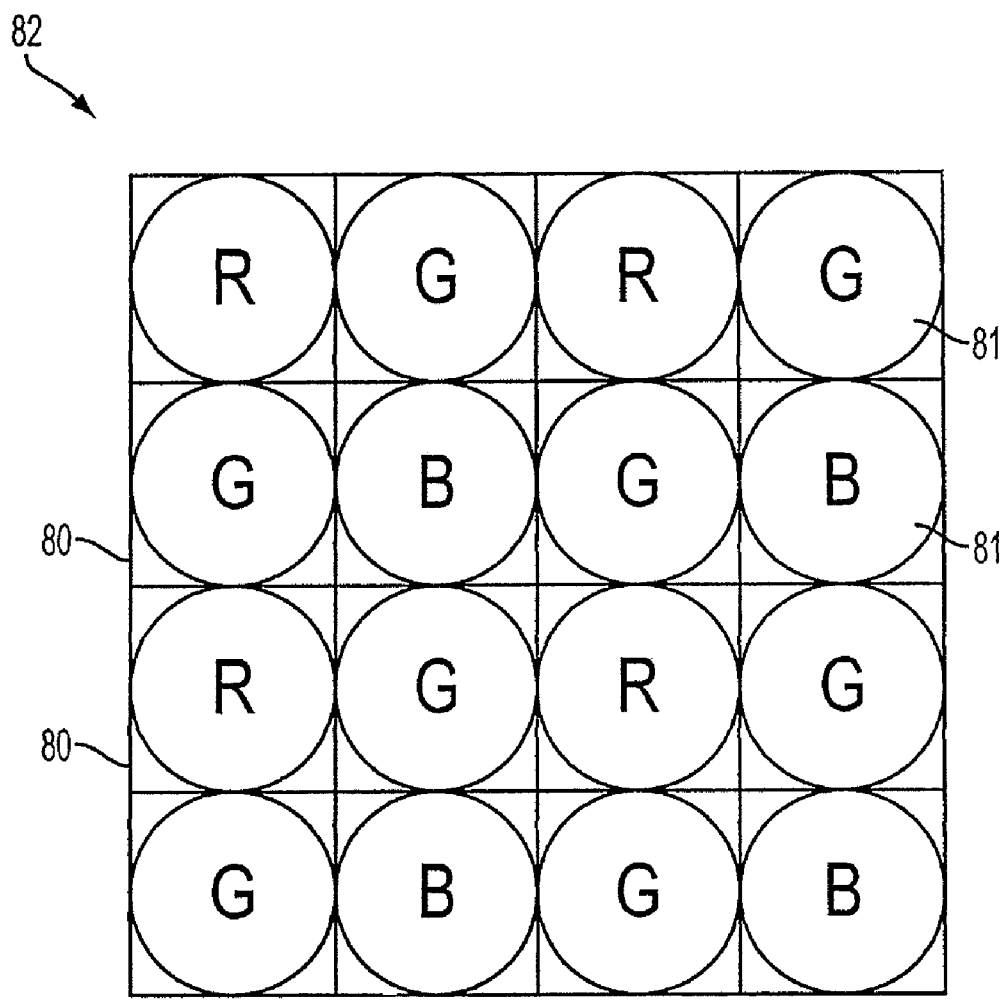
FIG. 1 is a top-down view of a conventional color filter array used in connection with an imager pixel array.
Figure 2:
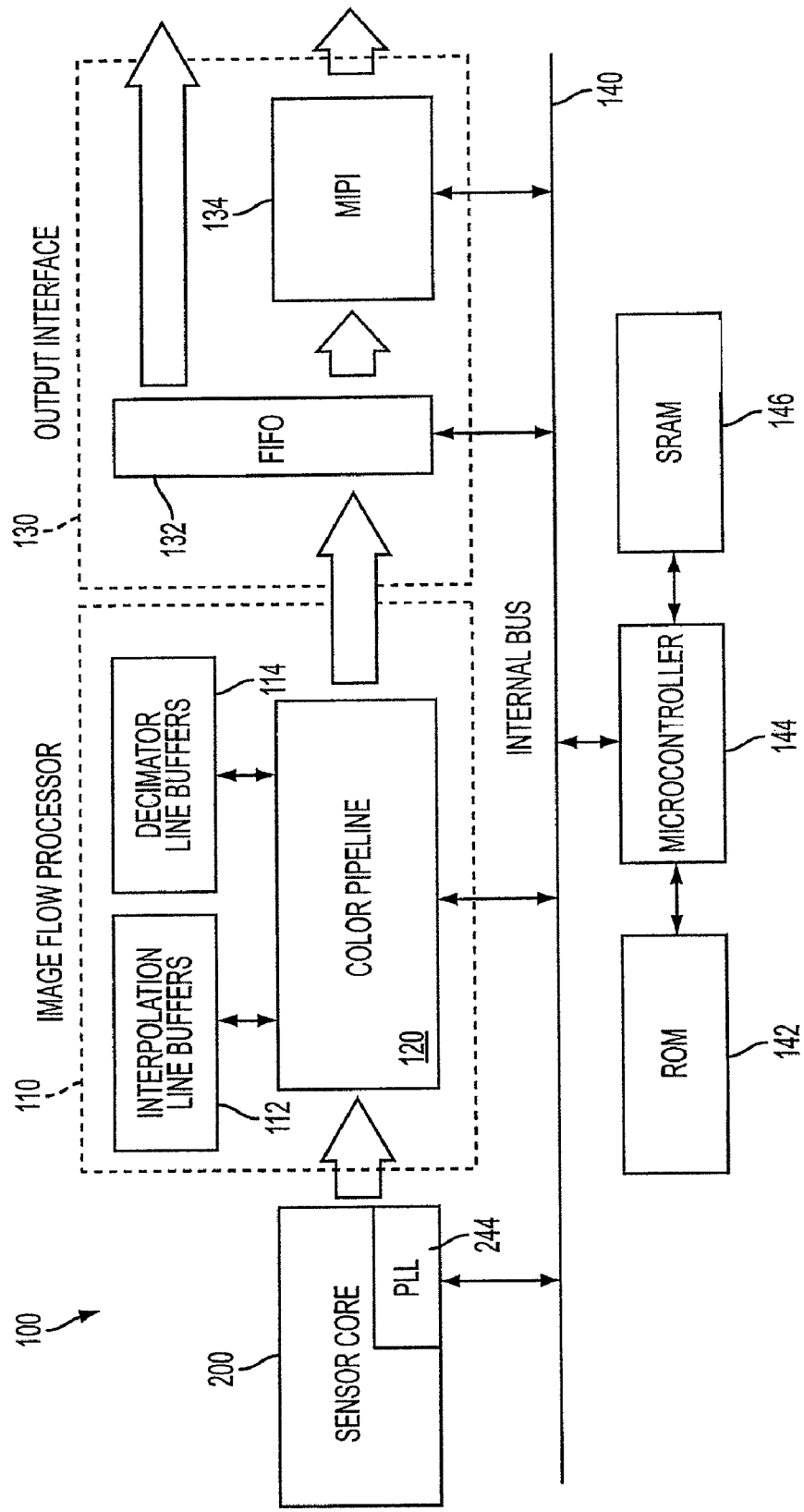
FIG. 2 is a block diagram of an imaging device which may implement an embodiment described herein.

Now referring to the figures, where like numerals designate like elements, FIG. 2 shows an embodiment of an image capture device 100. The FIG. 2 image capture device 100 may be implemented, though not required, as a system on a chip design, where all components illustrated are fabricated on a single integrated circuit. The image capture device 100 may use any type of image sensing technology, i.e., CCD, CMOS, etc.

The image capture device 100 comprises a sensor core 200 that communicates with an image flow processor 110 that is connected to an output interface 130. A phase lock loop (PLL) 244 is used as a clock for the sensor core 200. The image flow processor 110, which is responsible for image and color processing, includes interpolation line buffers 112, decimator line buffers 114, and a color processing pipeline 120. One of the functions of the color processor pipeline 120 is to perform demosaicing, and other pixel processing operations, including noise reduction in accordance with the embodiments as more fully discussed below.

The output interface 130 includes an output first-in-first-out (FIFO) parallel buffer 132, and a serial Mobile Industry Processing Interface (MIPI) output 134, particularly where the image capture device 100 is used in a camera in a mobile telephone environment. The user can select either a serial output or a parallel output by setting registers in a configuration register within the image capture device 100 chip. An internal bus 140 connects read only memory (ROM) 142, a microcontroller 144 and a static random access memory (SRAM) 146 to the sensor core 200, image flow processor 110, and output interface 130.

Figure 3:
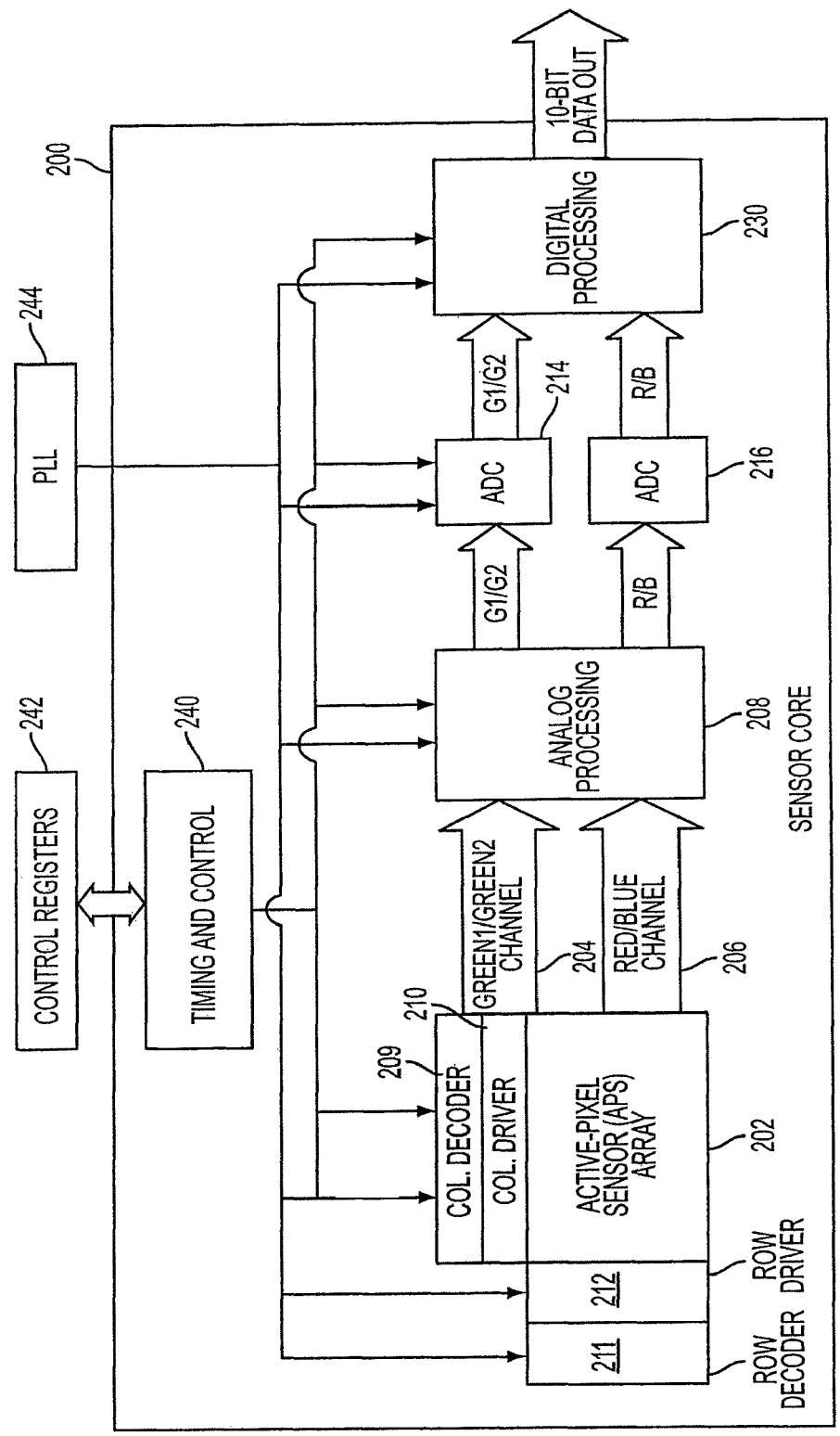
FIG. 3 is a block diagram of a sensor core depicted in FIG. 2.

FIG. 3 illustrates an exemplary sensor core 200 used in the FIG. 2 image capture device 100. The sensor core 200 includes in one embodiment a CMOS imager pixel array 202, although any type of solid state array core may be used with the invention. Pixel array 202 is connected to analog processing circuit 208 by a green1/green2 channel 204 which outputs pixel signals corresponding to two green channels of the pixel array, and through a red/blue channel 206 which contains pixel signals corresponding to the red and blue channels of the array.

Although only two channels 204 and 206 are illustrated, there are effectively four channels, since the green1 and green2 signals are read out at different times using channel 204, and the red and blue signals are likewise read out at different times using channel 206.

The analog processing circuitry 208 outputs RGB information as processed green1/green2 signals G1/G2 to a first analog-to-digital converter (ADC) 214 and processed red/blue signals R/B to a second analog-to-digital converter 216. The outputs of the two analog-to-digital converters 214, 216 are sent to a digital processor 230, which forms a digital representation of a captured image.

Connected to, or as part of, the array 202 are row and column decoders 211, 209 and row and column driver circuitry 212, 210 that are controlled by a timing and control circuit 240 to capture images using the array 202. The timing and control circuit 240 uses control registers 242 to determine how the array 202 and other components are controlled. As set forth above, the PLL 244 serves as a clock for the components in the core 200.

Pixel array 202 comprises a plurality of pixels arranged in a predetermined number of columns and rows. In operation, for a CMOS imager, the pixels of each row and array are all turned on at the same time by a row select line and the pixels of each column within the row are selectively output onto column output lines by a column select circuit. A plurality of row and column lines are provided for the entire array 202. The row lines are selectively activated by row driver circuitry 212 in response to row address decoder 211 and column select lines are selectively activated by a column driver 210 in response to column address decoder 209. Thus, a row and column address is provided for each pixel. The timing and control circuit 240 controls the address decoders 211, 209 for selecting the appropriate row and column lines for pixel readout, and the row and column driver circuitry 212, 210, which apply driving voltages to the drive transistors of the selected row and column lines.

Each column contains sampling capacitors and switches in the analog processing circuit 208 that read a pixel reset signal $V_{rst}$ and a pixel image signal $V_{sig}$ for selected pixels. Because the core 200 uses green1/green2 channel 204 and a separate red/blue channel 206, circuitry 208 will have the capacity to store $V_{rst}$ and $V_{sig}$ signals for green1/green2 and red/blue pixel signals. A differential signal ($V_{rst}-V_{sig}$) is produced by differential amplifiers contained in the analog processing circuitry 208. A differential signal ($V_{rst}-V_{sig}$) is produced by differential amplifiers contained within the circuitry 208 for each pixel output signal. Thus, the signals G1/G2 and R/B are differential signals representing respective pixel brightness values that are digitized by a respective analog-to-digital converter 214, 216. The analog-to-digital converters 214, 216 supply the digitized G1/G2 and R/B pixel signals to the digital processor 230 which forms the digital image output (e.g., a 10 bit digital output). The output is sent to the image flow processor 110 (FIG. 2) for further processing. The image flow processor 110 will, among things, perform color correction, and other adjustments on the captured image digital pixel values applied thereto.

Although the sensor core 200 has been described with reference to use of a CMOS imager pixel array, this is merely one type of sensor core that may be used. Other sensor cores having a different readout architecture may also be used. For example, a CCD core could be used, which supplies pixel signals for processing to an image flow signal processor 110. The color pipeline 120 of the image flow processor 110 performs a number of operations on the pixel signals received thereat, one of which is selective noise reduction.

For purposes of simplifying the present description, the following embodiments are described below in connection with reducing noise in a captured image. Noise reduction is performed selectively by distinguishing statistically significant image features from insignificant ones. Embodiments include dynamically varying the degree of aperture correction, dynamically varying the degree of blurring by the demosaic process, or both.

Embodiments described herein include comparing the target pixel and the at least one surround pixel to a dynamic noise threshold, and controlling a noise reduction operation based on the result of the comparison.

In general, statistically insignificant features are indistinguishable from noise in the image. If the feature is already masked heavily by noise, the amount of aperture correction applied to such features can be reduced without adversely impacting the visibility of that feature. Conversely, statistically significant features that do stand above noise level may be subjected to a full amount of aperture correction.

Edge-aware demosaic and noise reduction processes can benefit from a statistical measure of confidence about edge presence. Some edge-aware processes detect the presence of an edge by comparing a difference of values from pixels near each other to a threshold. The threshold is either fixed or set for the image based on current sensor analog gain and integration time. However, since the amount of noise in the pixel response may be a function of the pixel response itself, a fixed noise threshold can mistakenly detect the presence of an edge. Using a noise model leads to a more reliable detection of edges. In the case of an edge-aware demosaic or noise reduction it is possible to calculate the threshold as a function of the value of the pixel pair.

Embodiments described herein identify statistically significant image features based on having prior knowledge of image pixel noise characteristics and system noise characteristics. For each pixel being processed, an estimate of noise present in the pixel's signal value is calculated based on a noise model which includes information on pixel and pixel processing system noise, including noise estimate values and a floor threshold floor value. If the noise estimate is high, noise reduction is applied aggressively to that pixel since the noise is masking existing image features.

A pixel receiving a constant exposure can often be modeled by a random variable X with expected value E(X) and standard deviation as follows:

$$\sigma = \sqrt{a \cdot E(X)^2 + b \cdot E(X) + c} \tag{1}$$

where constants a, b, and c represent contributions to pixel noise from various sources. For example, a may correspond to the pixel response non-uniformity contribution; b may correspond to photon shot noise contribution; and c may correspond to read noise, fixed pattern noise, and digital quantization error. Pixel response non-uniformity is related to an individual pixel's conversion gain. Photon shot noise is related to a temporal variation in photon capture by an individual pixel's photosensor.

To estimate the amount of noise in the image the following techniques use simplified relationships compared to the formula above. The relationships are simplified to such an extent that they are suitable for simple and efficient hardware and software implementation.

Figure 4:
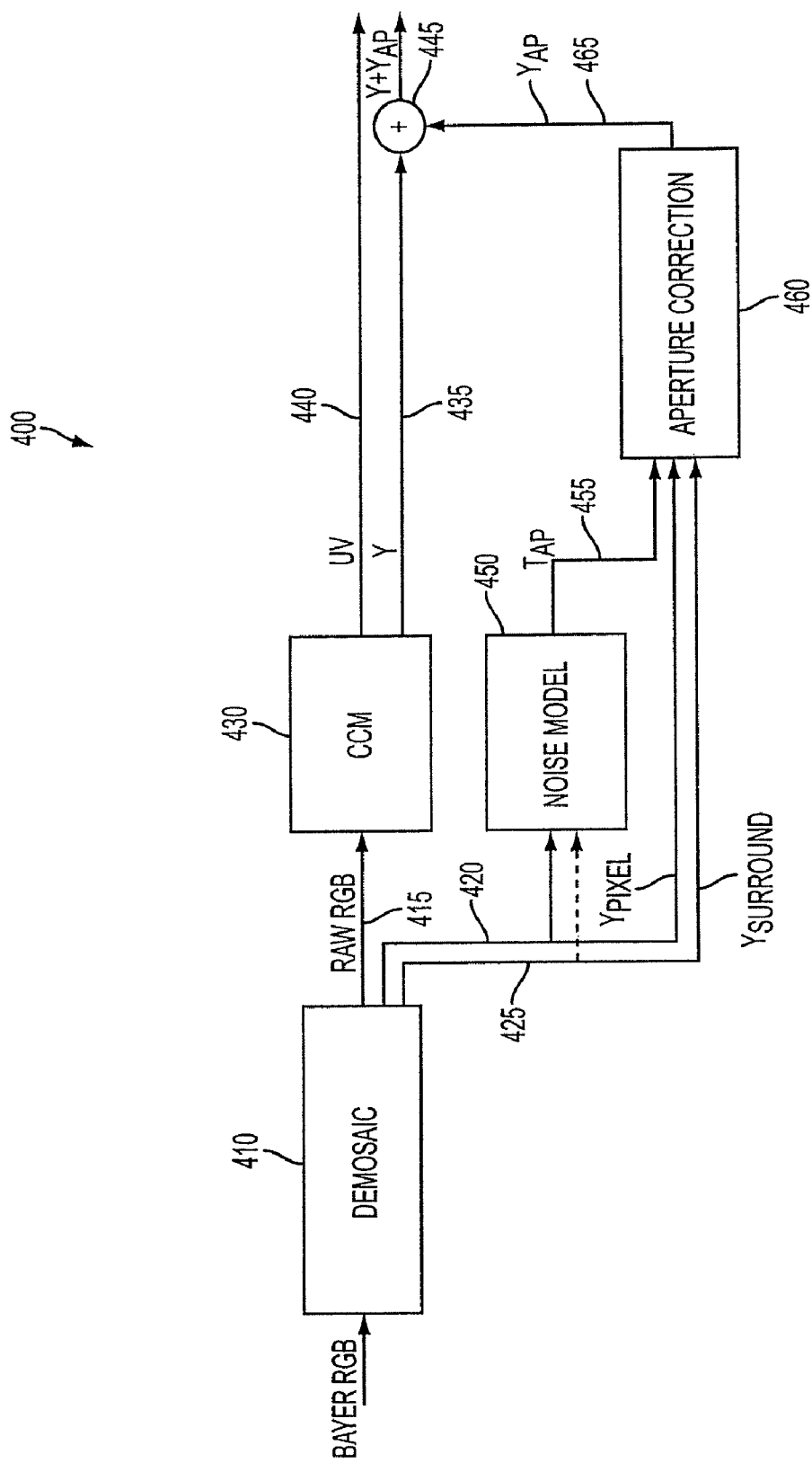
FIG. 4 is a block diagram of one embodiment of a portion of the color pipeline illustrated in FIG. 3.
Figure 5A:
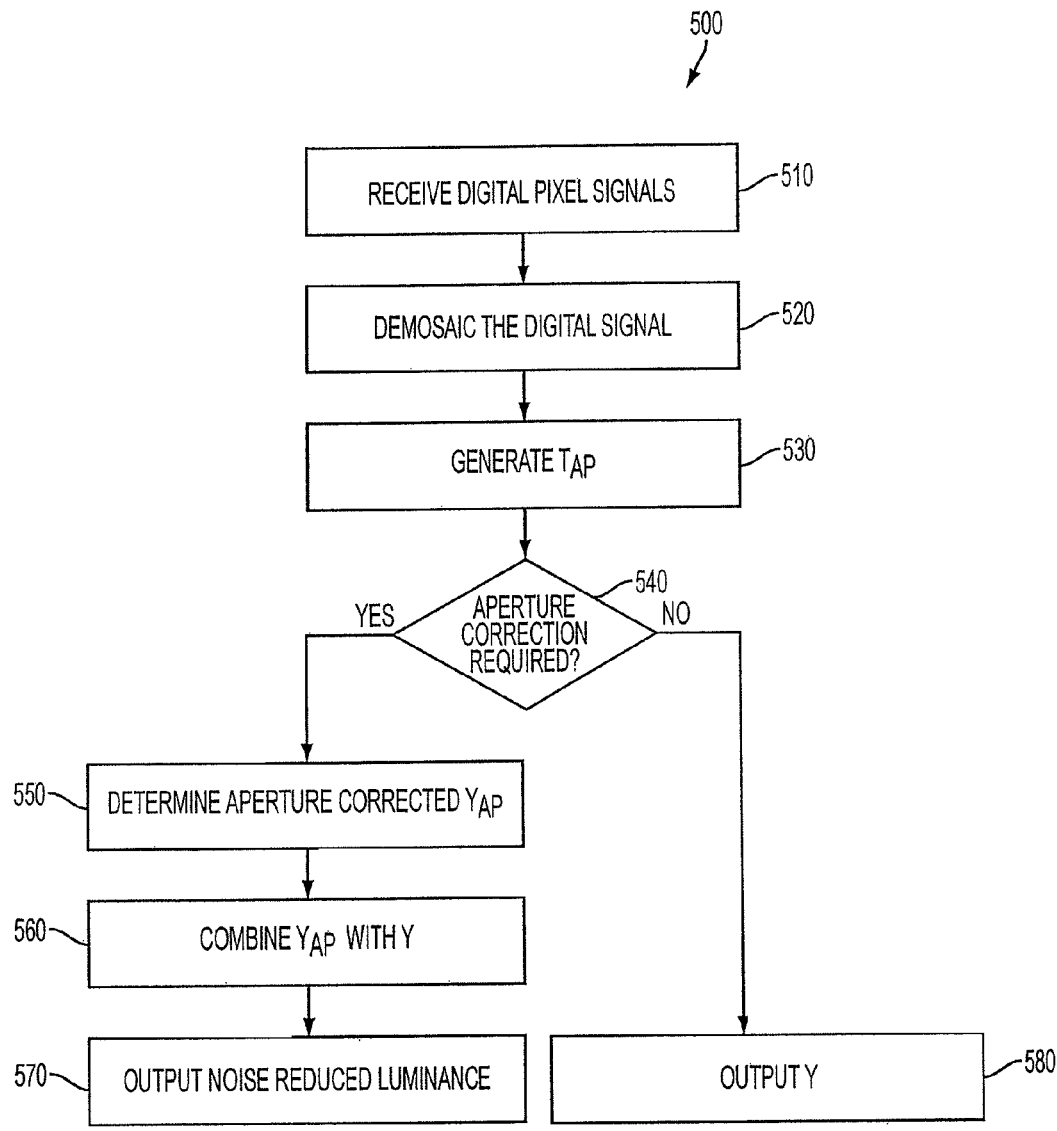
FIG. 5A is a flowchart of processing implemented by the FIG. 4 pipeline portion.

Referring to FIG. 4, a portion 400 of the color pipeline 120 of FIG. 2 is illustrated. FIG. 5A is a flowchart of processing 500 implemented by the FIG. 4 pipeline portion 400. Portion 400 includes a demosaicing unit 410, a color correction module 430, a noise model unit 450, an aperture correction unit 460, and a combining circuit 445.

Demosaicing unit 410 receives digital pixel signals from sensor core 200 as RGB signals (step 510) and produces demosaiced pixel signals as raw demosaiced data Raw RGB on output 415, and as luminance information $Y_{pixel}$ for demosaiced target pixels on output 420 (step 520). In addition, demosaiced luminance information $Y_{surround}$ for pixels surrounding the target pixel being processed is also provided on output 425. Color correction module 430 performs color correction processing of the demosaiced data Raw RGB. The color correction module 430 produces output color information in the known YUV format, where Y represents luminance output on path 435, and U and V represent chrominance components output on path 440 for further processing. The luminance component Y is sent to a combining circuit 445 which may be, for example, an adder unit. In another embodiment, the aperture correction signal $Y_{AP}$ can be added to demosaiced data Raw RGB, and the combination is then received by color correction module 430. In this case the demosaiced data Raw RGB should be converted to YUV format to make possible the addition of $Y_{AP}$ to the luminance component of the demosaiced data.

Noise model unit 450 receives the $Y_{pixel}$ signal and the $Y_{surround}$ signal, and determines a noise reducing threshold value $T_{AP}$ (step 530). Aperture correction unit 460 receives the noise reducing threshold value $T_{AP}$ from the output 455 of noise model unit 450, and the luminance signals $Y_{pixel}$ and $Y_{surround}$ from demosaicing unit 410, and determines whether aperture correction is required based on the received signals $T_{AP}$, $Y_{pixel}$, $Y_{surround}$ (step 540). Determination of whether aperture correction is required is described below.

If aperture correction is required (step 540), then aperture correction unit 460 produces a noise reduced aperture correction signal $Y_{AP}$ on output 465 (step 550) (described below) which is combined in combining circuit 445 with the luminance signal Y from color correction module 430, producing a corrected luminance signal Y+$Y_{AP}$ (step 560). The corrected luminance signal Y+$Y_{AP}$ is sent to other processing units in the color correction pipeline 120 (step 570). If aperture correction is not required for the target pixel (step 540), then only the luminance value Y is output from portion 400 (step 580).

Figure 5B:
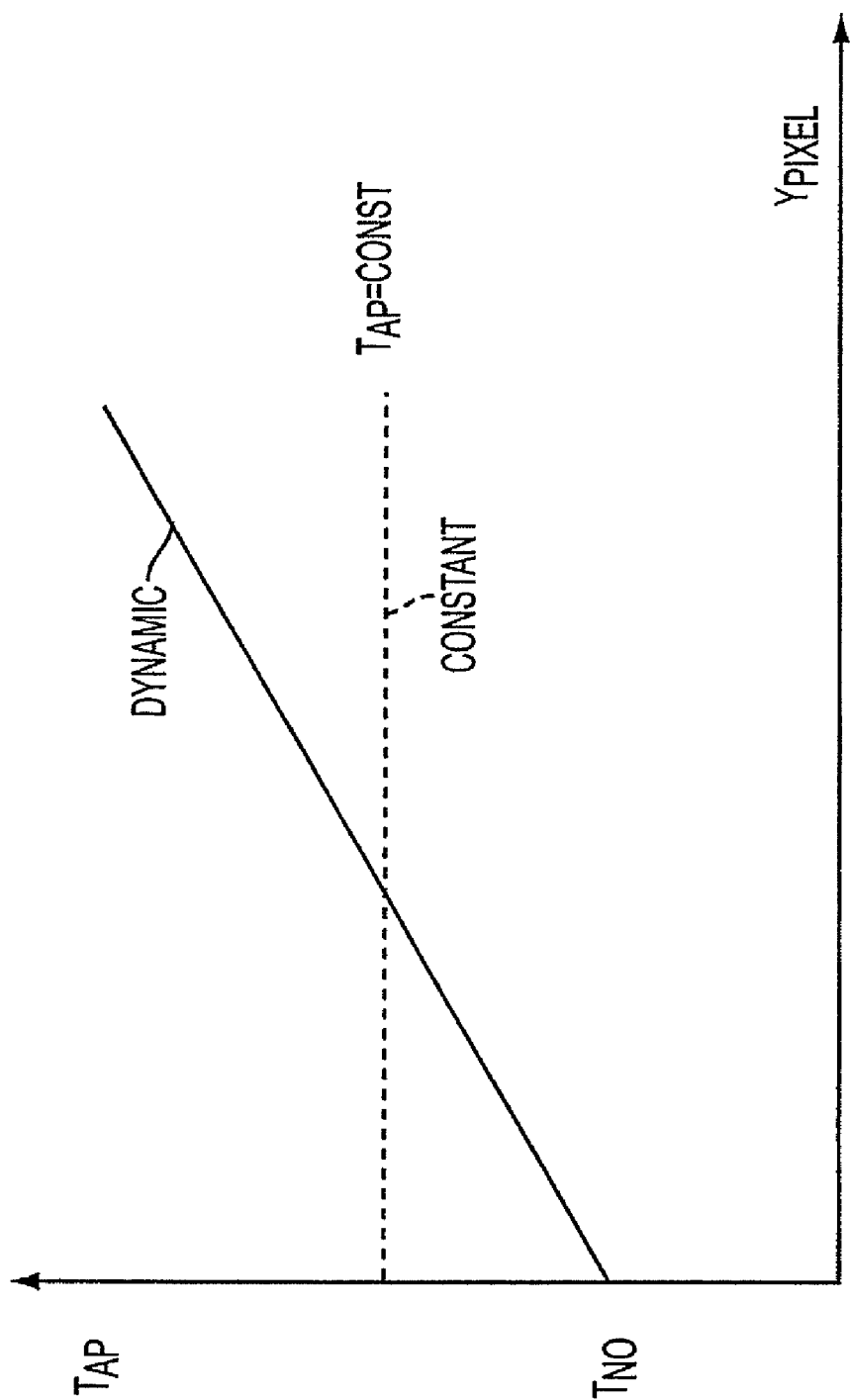
FIG. 5B is a graph of noise reducing threshold value as a function of a target pixel's luminance.

FIG. 5B is a graph of noise reducing threshold value $T_{AP}$ as a function of a target pixel's luminance $Y_{Pixel}$. The line Constant shows a conventional constant-value noise reducing threshold value $T_{AP}$, which causes the aperture correction process to blur dark areas (low $Y_{Pixel}$) too much and suppress noise insufficiently in bright areas (high $Y_{Pixel}$). The line Dynamic shows a dynamically set noise reducing threshold value $T_{AP}$, implemented in embodiments disclosed herein, which allows for different blurring amounts in bright and dark areas. $T_{N0}$ is a noise floor offset, a minimum noise reducing threshold value. Using a simple linear noise model the aperture correction ($Y_{AP}$) added into the image may be calculated in step 550 as follows:

$$Y_d = Y_{Pixel} - Y_{Surround} \tag{2}$$

$$Y_{AP} = (|Y_d| - T_{AP}) * k_{AP} * \text{sgn}(Y_d) \tag{3}$$

where $Y_{Pixel}$ is the target pixel's luminance, $Y_{Surround}$ is the average of the pixel's surrounding the target pixel, $Y_d$ is an intermediate value representing the difference between $Y_{Pixel}$ and $Y_{Surround}$, $T_{AP}$ is a noise reducing threshold value, $k_{AP}$ is an aperture correction gain, and $\text{sgn}(Y_d)$ is a value of 1 or −1 based on the sign of $Y_d$. Thus, if the difference between $Y_{Pixel}$ and $Y_{Surround}$ is greater than $T_{AP}$ (i.e., exceeds the noise reduction threshold value), then aperture correction unit 460 will generate a positive value for the noise reduced aperture correction signal $Y_{AP}$, indicating that aperture correction is required for the target pixel (step 570). Otherwise, aperture correction unit 460 will not generate the noise reduced aperture correction signal $Y_{AP}$, so that aperture correction is not performed for the target pixel (step 580).

In one embodiment, the noise reducing threshold value $T_{AP}$ may vary dynamically, as follows:

$$T_{AP} = Y_{Pixel} * k_N + T_{N0} \tag{4}$$

where $k_N$ is a pixel model noise slope, and $T_{N0}$ is a noise floor offset. This equation is a first-degree estimate of pixel noise as a function of the pixel response. A more complicated formula may be used to provide a more accurate estimate, if desired.

According to another embodiment, the noise reducing threshold value $T_{AP}$ is determined (step 530) according to:

$$T_{AP} = Y_{pixel} * k_{Npixel} + Y_{surround} * k_{Nsurround} + T_{N0} \tag{5}$$

where $k_{Npixel}$ is a noise estimate for the target pixel, $k_{Nsurround}$ is a noise estimate for the surrounding pixels, and $T_{N0}$ is a noise floor offset. In an alternative embodiment $Y_{pixel}$ can be replaced by the pixel value itself.

The noise model unit 450 and aperture correction unit 460 cooperate to substantially reduce noise in a captured image. Typically, aperture correction by unit 460 is designed to remove some of the blurring effects of the lens, the sensor array, and the demosaicing process performed by demosaicing unit 410. Each pixel is assigned a noise reducing threshold value $T_{AP}$ for comparison based on the noise model. The noise reducing threshold value $T_{AP}$ may be determined, for example, based on the brightness of the individual target pixel as illustrated in FIG. 5B. Therefore, selective sharpening may be employed to sharpen only parts of the image for which sharpening is necessary, thereby avoiding amplification of noise.

Figure 6:
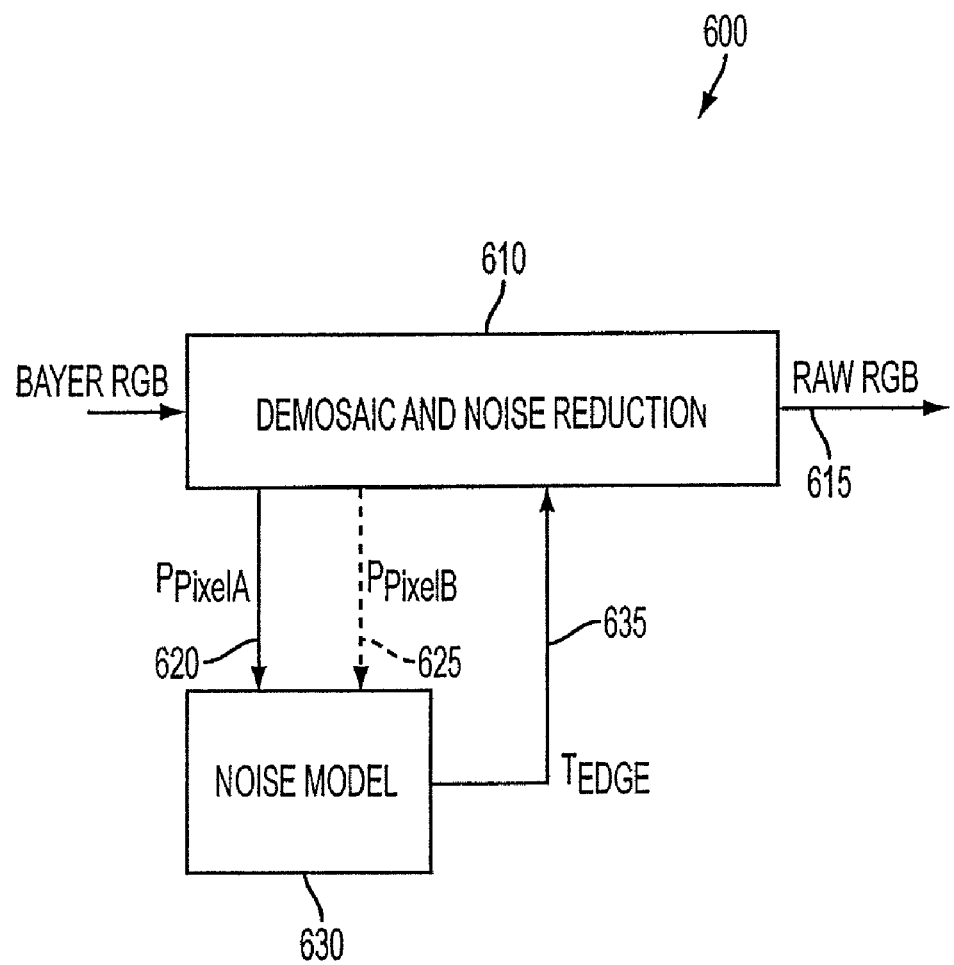
FIG. 6 is a block diagram of another embodiment of a portion of the color pipeline illustrated in FIG. 3.
Figure 7A:
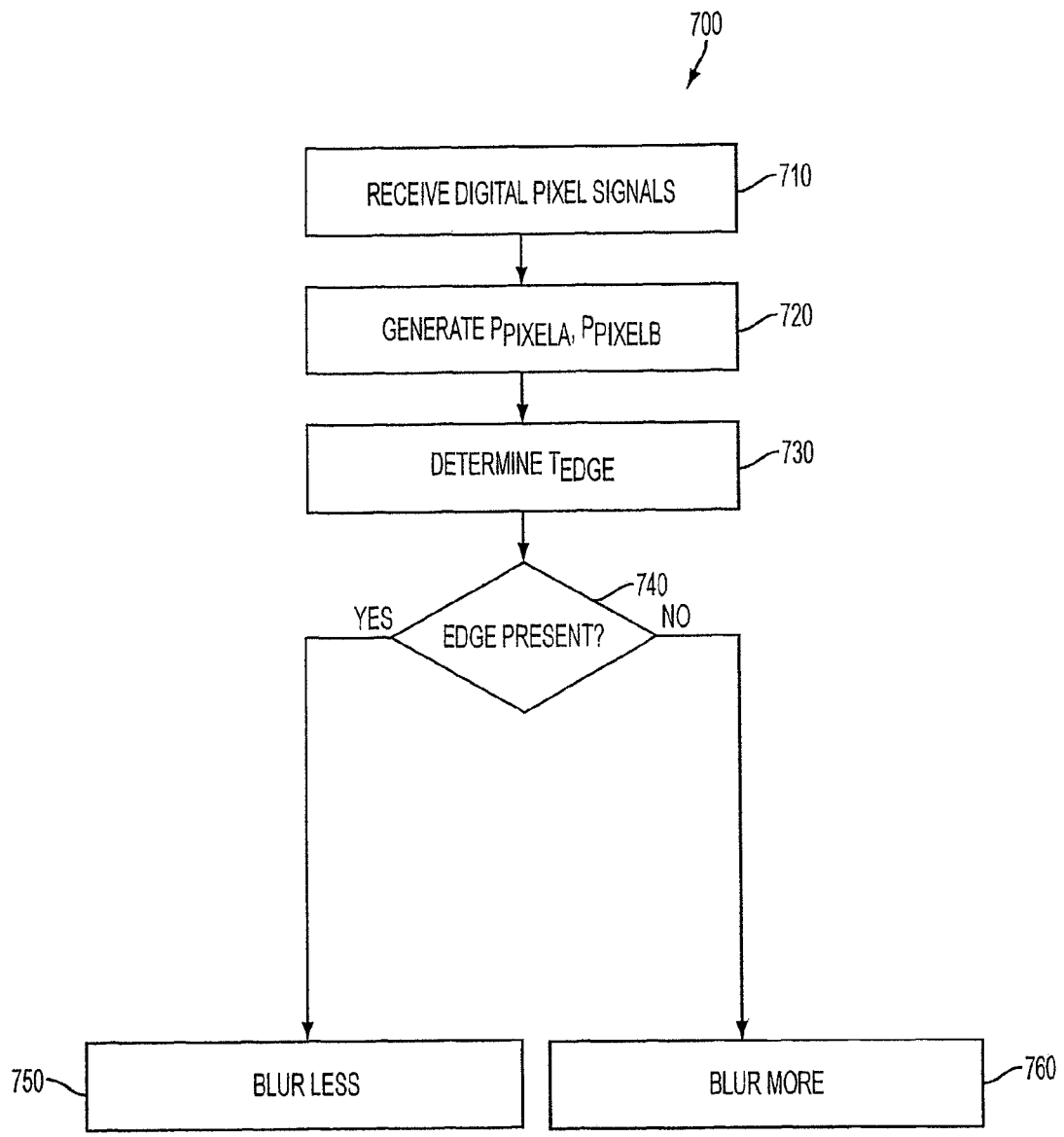
FIG. 7A is a flowchart of processing implemented by the FIG. 6 pipeline portion.

In another embodiment, noise reduction is performed during the demosaicing process. FIG. 6 is a block diagram of another embodiment of a portion 600 of the color pipeline 120 illustrated in FIG. 2. FIG. 7A is a flowchart of processing 700 implemented by the FIG. 6 pipeline portion 600. Portion 600 includes a demosaic and noise reduction unit 610 and a noise model unit 630.

Demosaic and noise reduction unit 610 receives digital pixel signals from sensor core 200 (FIG. 2) as Bayer RGB signals (step 710). In addition, demosaic and noise reduction unit 610 generates pixel values for a target pixel $P_{PixelA}$ on output 620, and pixel values for a nearby pixel $P_{PixelB}$ on output 625, which are received by noise model unit 630 (step 720). Noise model unit 630 dynamically generates the demosaic threshold $T_{edge}$ according to a noise model (step 730). The demosaic threshold $T_{edge}$ is then output to demosaic and noise reduction unit 610, which uses $T_{edge}$ to look for edges (step 740), or sharp transitions in color or brightness. Using a dynamically determined $T_{edge}$ using a noise model reduces the effects of noise in the edge detection process, which increases the accuracy of the edge detection.

If an edge is present, the demosaic and noise reduction unit 610 uses only surrounding pixels on the same side of the edge to produce demosaiced pixel signals as raw data Raw RGB on output 615 (step 750), which blurs the image less, i.e., only on the same side as the target pixel. If no edge is present, the demosaic and noise reduction unit 610 uses all surrounding pixels to produce demosaiced pixel signals as raw data Raw RGB on output 615 (step 760), which blurs the image more.

FIG. 7B is a diagram of a color filter array 770 including an edge. Color filter array 770 includes a target pixel A and a nearby pixel B, where target pixel A is adjacent to an edge, or brightness transition point. The presence of an edge may be tested for according to the following tests:

$$T_{edge} < |P_{PixelA} - P_{PixelB}| \text{ (i.e., edge is present)} \quad (6)$$

$$T_{edge} \geq |P_{PixelA} - P_{PixelB}| \text{ (i.e., edge is not present)} \quad (7)$$

where $T_{edge}$ is the demosaic threshold, $P_{PixelA}$ is the pixel value for the target pixel, and $P_{PixelB}$ is the pixel value for the nearby pixel.

The demosaic threshold $T_{edge}$ may be calculated dynamically by either of the following:

$$T_{Edge} = P_{PixelA} * k_N + T_{N0}, \text{ or} \quad (8)$$

$$T_{Edge} = P_{PixelA} * k_{N\,A} + P_{PixelB} * k_{N\,B} + T_{N0} \quad (9)$$

where $k_N$, $k_{N\,A}$, $k_{N\,B}$ and $T_{N0}$ are coefficients making up a linear noise model.

In another embodiment, an edge may be detected according to a quadratic model, including:

$$T_{edge}^2 < (P_{PixelA} - P_{PixelB})^2 \text{ (i.e., edge is present)} \quad (10)$$

$$T_{edge}^2 \geq (P_{PixelA} - P_{PixelB})^2 \text{ (i.e., edge is not present), where} \quad (11)$$

$$T_{edge}^2 = P_{PixelA}^2 * k_{N\,A2} + P_{PixelA} * k_{N\,A1} + T_{N0}, \text{ or alternatively,} \quad (12)$$

$$T_{edge}^2 = P_{PixelA}^2 * k_{N\,A2} + P_{PixelA} * k_{N\,A1} + P_{PixelB}^2 * k_{N\,B2} + P_{PixelB} * k_{N\,B1} + T_{N0} \quad (13)$$

where $T_{edge}$ is the demosaic threshold, $P_{PixelA}$ is the pixel value for the target pixel, $P_{PixelB}$ is the pixel value for the nearby pixel, and where $k_{N\,A1}$, $k_{N\,B1}$, $k_{N\,A2}$, $k_{N\,B2}$, and $T_{N0}$ are coefficients making up a quadratic noise model. The hardware implementation for performing these calculations may be relatively inexpensive, as square root calculations may be avoided by raising both sides of the inequality to the power of two.

Other embodiments may perform edge detection by comparing two areas of an image, rather than only two pixels of the image. Using formulas (10) through (13) to detect the edge, $P_{PixelA}$ and $P_{PixelB}$ may be substituted with an estimate for area brightness on one side of the edge and on the other side according to:

$$P_{PixelA}(x,y) = P_{AreaA}(x,y) = \text{avg}(P_{i,j} | P_{i,j} \text{ adjacent to pixel } (x,y) \text{ and } P_{i,j} \text{ on side } A) \quad (14)$$

$$P_{PixelB}(x,y) = P_{AreaB}(x,y) = \text{avg}(P_{i,j} | P_{i,j} \text{ adjacent to pixel } (x,y) \text{ and } P_{i,j} \text{ on side } B) \quad (15)$$

where $P_{AreaA}$ is an estimate for area brightness for the area defined by the target pixel A. at the location (x,y) and selected pixels surrounding the target pixel A, $P_{AreaB}$ is an estimate for area brightness for the area defined by the neighboring pixel B on the other side of the edge being tested, i and j are coordinates for the central target pixel A, and avg is an averaging function.

FIG. 7C is a diagram of another color filter array 780 including an edge. As another example, color filter array 780 includes a plurality of target pixels E and a plurality of nearby pixels F, where the area defined by the target pixels E is adjacent to an edge. In color filter array 780, the target pixels E and nearby pixels F are evenly distributed within their respective areas, with eight target pixels E and five nearby pixels F. Therefore, using equations (14) and (15) above, the estimates for area brightness become:

$$P_{AreaE}(x,y) = \text{avg}(P_{i,j}, P_{i-2,j}, P_{i+2,j}, P_{i,j-2}, P_{i-2,j-2}, P_{i+2,j-2}) \quad (16)$$

$$P_{AreaF}(x,y) = \text{avg}(P_{i,j+2}, P_{i-2,j+2}, P_{i+2,j+2}) \quad (17)$$

where $P_{AreaE}$ is an estimate for area brightness for an area defined by the target pixels E, $P_{AreaF}$ is an estimate for area brightness for an area defined by the nearby pixels F, i and j are coordinates for a central target pixel E, and avg is an averaging function.

The disclosed techniques may also be applied to noise reduction filters that operate on raw data before demosaicing and rely on edge detection. Such techniques typically assess if an edge is present in a local neighborhood. If no edges are present, a filter may average or otherwise blur pixel responses. However, if an edge is present, the blur may not be applied; or the blur may be applied to average or blur along the edge, and not across the edge.

Performance of such filters may be improved by using a pixel noise model to detect edges, for example, using techniques such as those illustrated in FIGS. 7B and 7C. The amount of blur applied may also be dynamically adjusted similarly to the technique illustrated in FIG. 4.

There are many existing techniques for edge detection. It should be understood that the disclosed techniques may be applied to other edge detection methods. For example, demosaicing may detect an edge while examining the green color planes by comparing a green pixel estimate with the values of four surrounding green pixels. The green pixel estimate, for example, may be computed as an average or a median value of the four surrounding green pixels. Equations (6) through (13) may be applicable in such cases, as well.

In a camera, pixel noise model parameters may be separately selected and used for each available ISO setting. If a camera does not explicitly support ISO settings, pixel noise model parameters may be varied as a function of analog gain settings and/or digital gain settings. If appropriate, individual parameters should be used for each color channel. For example, when performing edge detection using a pixel noise model on a Bayer pattern array as shown in FIG. 7C, a separate set of parameters may be used when comparing pixels in the red, green, and blue color planes if pixels of different colors have a different analog and/or digital gain. If the digital gain varies as a function of pixel location, such as to compensate for lens vignetting effects, pixel noise model parameters may also be varied accordingly as a function of pixel location.

It should be noted that the embodiments described with reference to FIGS. 4-7C may be used independently, as well as together, in the same system, e.g. imaging device 100.

Figure 8:
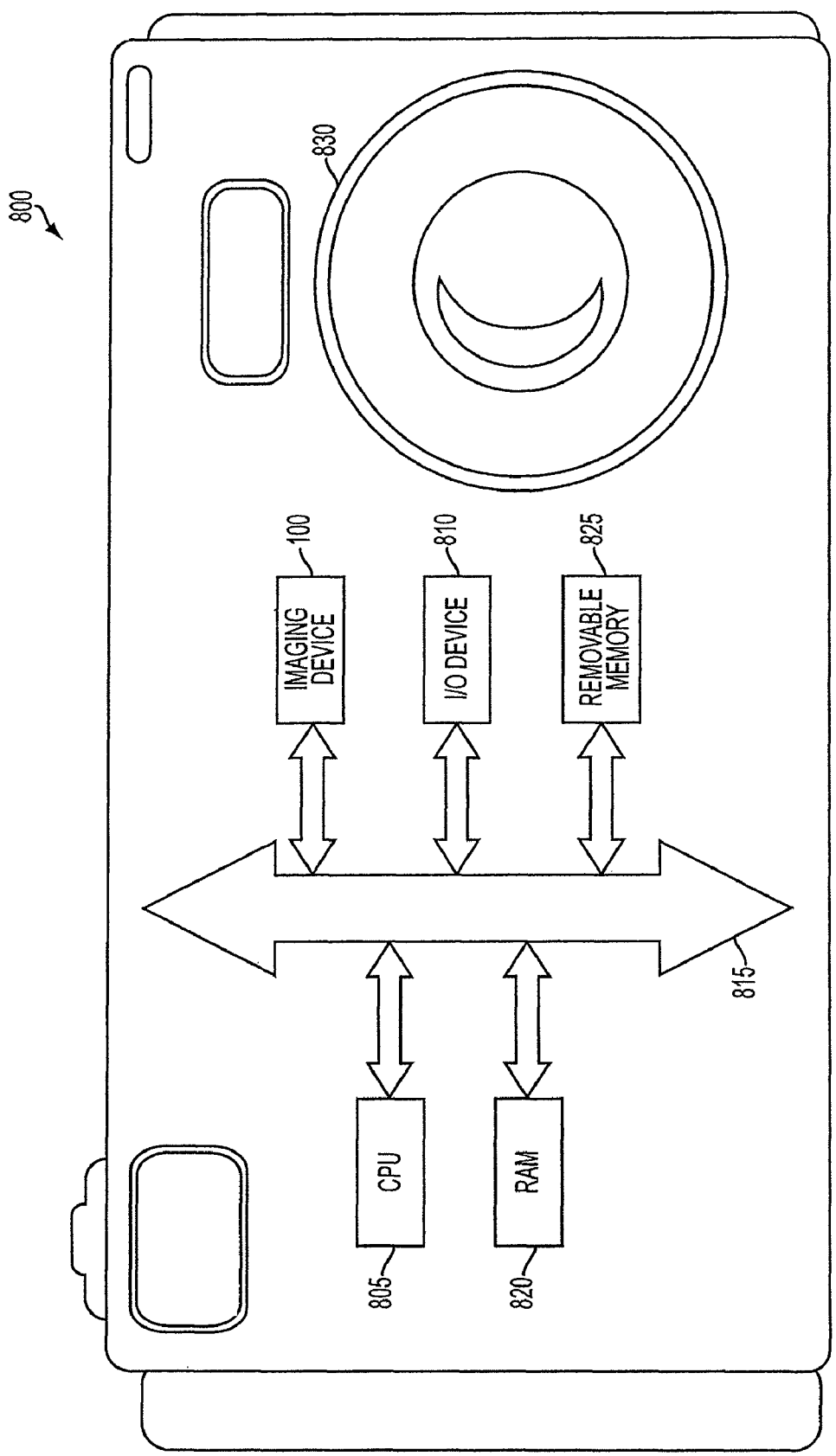
FIG. 8 is an embodiment of a camera system which can be used with the FIG. 2 imaging device.

FIG. 8 is an embodiment of a camera system which can be used with the FIG. 2 imaging device 100 having a color pipeline 120 implementing an embodiment of the invention. Camera system 800, for example, a still or video camera system, which generally comprises a lens 830 for focusing an image on the pixel array 202 (FIG. 2), a central processing unit (CPU) 805, such as a microprocessor for controlling camera operations, that communicates with one or more input/output (I/O) devices 810 over a bus 815. Imaging device 100 also communicates with the CPU 805 over bus 815. The system 800 also includes random access memory (RAM) 820, and can include removable memory 825, such as flash memory, which also communicate with CPU 805 over the bus 815. Imaging device 100 may be combined with a processor, such as a CPU, digital signal processor, or microprocessor, with or without memory storage on a single integrated circuit or on a different chip than the processor.

The camera system 800 is an example of a system having digital circuits that could include image sensor device. Without being limiting, such a system could include a computer system, camera system, scanner, machine vision, vehicle navigation, video phone, surveillance system, auto focus system, star tracker system, motion detection system, image stabilization system, and data compression system.

The processes and devices in the above description and drawings illustrate examples of methods and devices of many that could be used and produced to achieve the objects, features, and advantages of embodiments described herein. Thus, they are not to be seen as limited by the foregoing description of the embodiments, but only limited by the appended claims.

What is claimed as new and desired to be protected by Letters Patent of the United States is:

1. A method of processing imager pixel signals to reduce noise in a captured image, the method comprising:
   receiving a target pixel signal and at least one neighboring pixel signal representing respective pixel signals in the captured image;
   formulating a dynamic noise signal based at least in part on a value of the target pixel signal;
   subtractively combining the target pixel signal and the at least one neighboring pixel signal to form an intermediate value;
   subtractively combining the intermediate value and the dynamic noise signal to form a noise adjustment signal; and
   adding the noise adjustment signal to the target pixel signal only if the intermediate value is greater than the dynamic noise signal.

2. The method of claim 1, wherein the dynamic noise signal is determined in part from information on target pixel noise and pixel processing system noise.

3. The method of claim 1, wherein the noise reduction operation comprises controlling an aperture correction operation when the intermediate value representing the subtractive combination of the target pixel signal and the at least one neighboring pixel signal exceeds the dynamic noise signal.

4. The method of claim 3, wherein the aperture correction forms an aperture correction signal in accordance with a luminance value of the target pixel signal and a luminance value of the at least one neighboring pixel signal, a magnitude of the aperture correction signal being determined by an amount by which the intermediate value exceeds the dynamic noise signal.

5. The method of claim 4, wherein the aperture correction signal is a luminance signal which is combined with a luminance signal of the target pixel.

6. The method of claim 1, wherein the noise reduction operation comprises controlling an amount of blurring introduced by a color demosaicing operation in accordance with the dynamic noise signal.

7. A method of processing pixel image signals to reduce noise in a captured image, the method comprising:
   receiving a target pixel signal;
   receiving at least one neighboring pixel signal, each associated with a pixel signal in the captured image;
   determining a dynamic noise threshold based on at least the target pixel signal and a noise model;
   performing an aperture correction operation if a subtractive combination of the target pixel signal with the neighboring pixel signal exceeds the dynamic noise threshold, wherein
   if it is determined that the combination exceeds the dynamic noise threshold, applying noise reduction processing to the target pixel signal which comprises adding the target pixel signal to an adjustment signal as part of the aperture correction operation, the adjustment signal being formed by subtractively combining a dynamic noise signal with the subtractive combination of the target pixel signal and the neighboring pixel signal.

8. The method of claim 7, further comprising controlling a level of the adjustment signal in accordance with an amount by which the subtractive combination of the target pixel signal and the neighboring pixel signal exceeds the dynamic noise threshold.

9. The method of claim 8, wherein the aperture correction operation forms a noise corrected luminance component of the target pixel signal.

10. A method of processing imager pixel signals in an image pipeline to reduce noise in a captured image, the method comprising:
    receiving in an image pipeline a target pixel signal and at least one neighboring pixel signal representing respective pixel signals in the capture image;
    formulating a dynamic noise signal based at least in part on a value of the target pixel signal;
    subtractively combining the target pixel signal and the at least one neighboring pixel signal to form an intermediate value;
    subtractively combining the intermediate value and the dynamic noise signal to form a noise adjustment signal; and
    adding the noise adjustment signal to the target pixel signal only if the intermediate value is greater than the dynamic noise signal.

11. The method of claim 10, wherein the dynamic noise signal is determined in part from information on target pixel noise and pixel processing system noise.

12. The method of claim 10, wherein the noise reduction operation comprises controlling an amount of blurring introduced by a. color demosaicing operation in accordance with the dynamic noise signal.

13. An imaging device for processing pixel signals to reduce noise in a captured image, the device comprising:
a pixel processing unit for processing a received target pixel signal and at least one neighboring pixel signal representing respective pixel signals in the captured image, the pixel processing unit subtractively combines the received target pixel signal and the at least one neighboring pixel signal to form an intermediate value;
a noise unit for providing a dynamic noise signal; and
a pixel processing control unit for controlling the pixel processing unit in accordance with a noise adjustment signal by adding the noise adjustment signal to the target pixel signal only if the intermediate value is greater than the dynamic noise signal, the noise adjustment signal being formed by subtractively combining the intermediate value and the dynamic noise signal.

14. The imaging device of claim 13, wherein the dynamic noise signal is determined in part from information on target pixel noise and pixel processing system noise.

15. The imaging device of claim 14, wherein:
the noise unit comprises a noise model unit for determining a dynamic noise threshold based on at least the target pixel signal and a noise model; and
wherein the pixel processing unit comprises:
an aperture correction unit for:
comparing the intermediate value that represents the subtractive combination of the target pixel signal and at least one neighboring pixel signal to the dynamic noise threshold, and
controlling a noise reduction operation when the intermediate value exceeds a level of the dynamic noise threshold.

16. The imaging device of claim 15, wherein the aperture correction unit adds an adjusted amount to a level of the target pixel signal which depends on the amount by which the level of the subtractive combination exceeds the level of the dynamic noise threshold.

17. The imaging device of claim 16, wherein the aperture correction unit is configured to form a noise corrected aperture correcting signal in accordance with a luminance value of the target pixel signal and a luminance value of the at least one neighboring pixel signal, a magnitude of the aperture correction signal being determined by an amount by which a subtractive combination of the target pixel signal luminance value and the neighboring pixel signal luminance value exceeds the dynamic noise threshold.

18. The imaging device of claim 17, wherein the aperture correction signal is a luminance signal which is combined with a luminance signal of the target pixel.

19. The imaging device of claim 16, further comprising:
a color correction unit for generating corrected color values for the target pixel, the corrected color values including a luminance value; and
a combining circuit for combining the adjustment amount to the luminance value of the color corrected target pixel.

20. A device for processing pixel signals to reduce noise in a captured image, the device comprising:
a noise model unit for determining a dynamic noise threshold based on at least a first target pixel signal and a noise model;
an aperture correction unit for:
comparing a combined subtractive value of the target pixel signal and a neighboring pixel signal representing respective pixel signals in the capture image to the dynamic noise threshold, and
controlling an aperture correction operation based on the result of the comparison, wherein if it is determined that the combined subtractive value exceeds the dynamic noise threshold, the aperture correction unit applies noise reduction processing to the target pixel signal which comprises adding the target pixel signal to an adjustment signal as part of the aperture correction operation, the adjustment signal being formed by subtractively combining a dynamic noise signal with the combined subtractive value of the target pixel signal and the neighboring pixel signal.

21. The device of claim 20, wherein the noise reduction operation further comprises increasing the first target pixel signal level by an amount dependent on the amount by which the subtractive combination exceeds the dynamic noise threshold.

22. A camera system comprising:
a lens; and
an imaging device having a pixel array for capturing an image through the lens, and for generating and processing pixel signals to reduce noise in the captured image, the imaging device further comprising:
a pixel processing unit for processing a received first target pixel signal and at least one neighboring pixel signal representing respective pixel signals in the capture image;
a threshold unit for providing a dynamic noise threshold; and
a control unit for controlling the pixel processing unit in accordance with a relationship of at least the first target pixel signal to the dynamic noise threshold, the control unit controls the pixel processing unit by adding the first target pixel signal to a noise adjustment signal, the noise adjustment signal being formed by subtractively combining the dynamic noise threshold and a subtractive combination of the received first target pixel signal and the at least one neighboring pixel signal representing respective pixel signals in the captured image.

23. The camera system of claim 22, wherein the dynamic noise threshold is determined in part from information on target pixel noise and pixel processing system noise.

24. The camera system of claim 23, further comprising:
a noise model unit for determining the dynamic noise threshold based on at least the first target pixel signal and a noise model; and
an aperture correction unit configured to:
compare the subtractive combination of at least the first target pixel signal and the at least one neighboring pixel signal to the dynamic noise threshold, and
control a noise reduction operation when a level of the subtractive combination exceeds a level of the dynamic noise threshold.

25. The camera system of claim 23, further comprising:
a color correction unit for generating corrected color values, the corrected color values comprising a second target pixel signal; and
a combining circuit for combining the noise reduction processed first target pixel signal with the second target pixel signal.

26. A camera system comprising:
a lens; and an imaging device having a pixel array for capturing an image through the lens, and for generating and processing pixel signals to reduce noise in the captured image, the imaging device further comprising:

an image pipeline for receiving pixel signals including a target pixel signal and at least one neighboring pixel signal associated with the captured image, the image pipeline comprising:

a threshold unit for providing a dynamic noise threshold based at least in part on a value of the target pixel signal; and a pixel processing unit for processing the received target pixel signal in accordance with the dynamic noise threshold by adding the target pixel signal to a noise adjustment signal, the noise adjustment signal being formed by subtractively combining the dynamic noise signal and a subtractive combination of the received target pixel signal and the at least one neighboring pixel signal associated with the captured image.

27. A method of processing imager pixel signals to reduce noise in a captured image, the method comprising:

receiving a target pixel signal and a plurality of neighboring pixel signals representing respective pixel signals in the captured image;

formulating a dynamic noise signal based at least in part on a value of the target pixel signal;

subtractively combining the target pixel signal and an average of the plurality of neighboring pixel signals to form an intermediate value; and controlling a noise reduction operation using a noise adjustment signal, the noise adjustment signal being formed by subtractively combining the intermediate value and the dynamic noise signal.

* * * * *